US012619302B2

(12) United States Patent  
Mitsugi et al.

(10) Patent No.: US 12,619,302 B2  
(45) Date of Patent: May 5, 2026

(54) IMAGING APPARATUS, METHOD OF CONTROLLING IMAGING APPARATUS, AND PROGRAM

(71) Applicant: Sony Group Corporation, Tokyo (JP)

(72) Inventors: Masakazu Mitsugi, Kanagawa (JP); Masanari Sugita, Tokyo (JP)

(73) Assignee: Sony Group Corporation, Tokyo (JP)

( * ) Notice: Subject to any disclaimer, the term of this patent is extended or adjusted under 35 U.S.C. 154(b) by 189 days.

(21) Appl. No.: 17/910,225

(22) PCT Filed: Apr. 1, 2021

(86) PCT No.: PCT/JP2021/014160  
§ 371 (c)(1),  
(2) Date: Sep. 8, 2022

(87) PCT Pub. No.: WO2021/205979  
PCT Pub. Date: Oct. 14, 2021

(65) Prior Publication Data  
US 2023/0131361 A1 Apr. 27, 2023

(30) Foreign Application Priority Data

Apr. 9, 2020 (JP) ................................. 2020-070162

(51) Int. Cl.  
*G06F 3/01* (2006.01)  
*G03B 13/02* (2021.01)  
*H04N 23/611* (2023.01)

(52) U.S. Cl.  
CPC ............. *G06F 3/013* (2013.01); *G03B 13/02* (2013.01); *H04N 23/611* (2023.01); *G03B 2213/025* (2013.01)

(58) Field of Classification Search  
CPC ......................... G03B 2213/025; G02B 7/287  
See application file for complete search history.

(56) References Cited

U.S. PATENT DOCUMENTS

| | | | | |
|---|---|---|---|---|
| 5,692,222 A | * | 11/1997 | Yamada | ................... G02B 7/28 |
| | | | | 396/51 |
| 5,758,201 A | * | 5/1998 | Watanabe et al. | |
| 2012/0044347 A1 | | 2/2012 | Sugio | |
| 2019/0147618 A1 | | 5/2019 | Sugimoto | |
| 2021/0051266 A1 | * | 2/2021 | Matsuo | ................... H04N 23/73 |

FOREIGN PATENT DOCUMENTS

| | | |
|---|---|---|
| CN | 109478334 A | 3/2019 |
| JP | H05210040 A | 8/1993 |
| JP | H089237 A | 1/1996 |
| JP | 2001201680 A | 7/2001 |

(Continued)

OTHER PUBLICATIONS

International Search Report (PCT/ISA/210), International Application No. PCT/JP2021/014160, dated Jul. 6, 2021.

*Primary Examiner* — Noam Reisner  
(74) *Attorney, Agent, or Firm* — Michael Best & Friedrich LLP

(57) ABSTRACT

An imaging apparatus includes a control unit that executes control in a manner corresponding to the fact that a state of an image capturing person determined on the basis of line-of-sight information is a gaze target undetermined state in which a gaze target has not been determined.

20 Claims, 11 Drawing Sheets

(56)     References Cited

FOREIGN PATENT DOCUMENTS

| JP | 2002301030 | A | 10/2002 |
| JP | 2006139294 | A | 6/2006 |
| JP | 2007310454 | A | 11/2007 |
| JP | 2008306533 | A | 12/2008 |
| JP | 2012065311 | A | 3/2012 |

* cited by examiner

Figure 10:
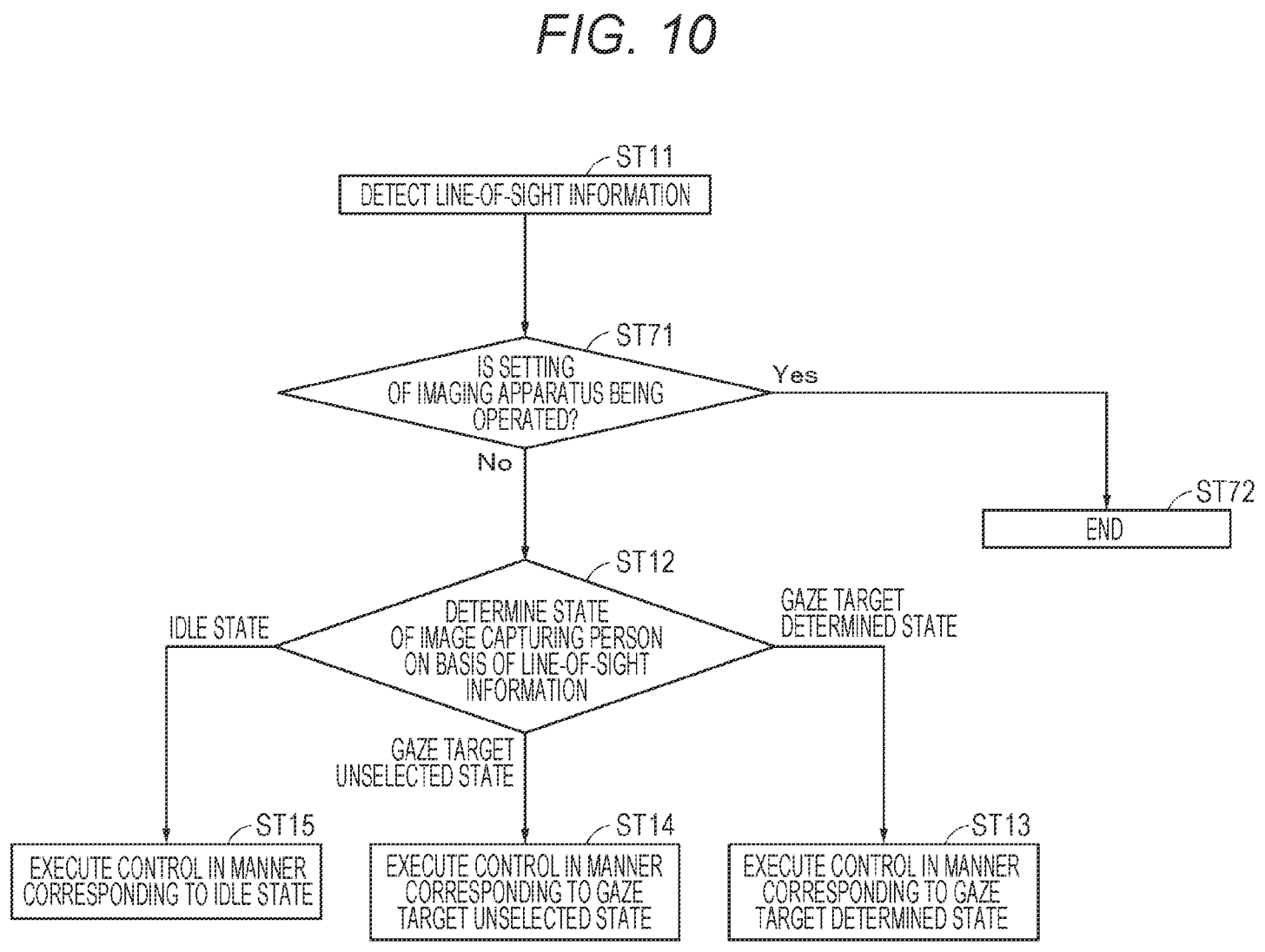

ST11
DETECT LINE-OF-SIGHT INFORMATION

ST71
IS SETTING OF IMAGING APPARATUS BEING OPERATED?

Yes → ST72 END

No

ST12
DETERMINE STATE OF IMAGE CAPTURING PERSON ON BASIS OF LINE-OF-SIGHT INFORMATION

GAZE TARGET DETERMINED STATE
ST13
EXECUTE CONTROL IN MANNER CORRESPONDING TO GAZE TARGET DETERMINED STATE

GAZE TARGET UNSELECTED STATE
ST14
EXECUTE CONTROL IN MANNER CORRESPONDING TO GAZE TARGET UNSELECTED STATE

IDLE STATE
ST15
EXECUTE CONTROL IN MANNER CORRESPONDING TO IDLE STATE

*FIG. 11*

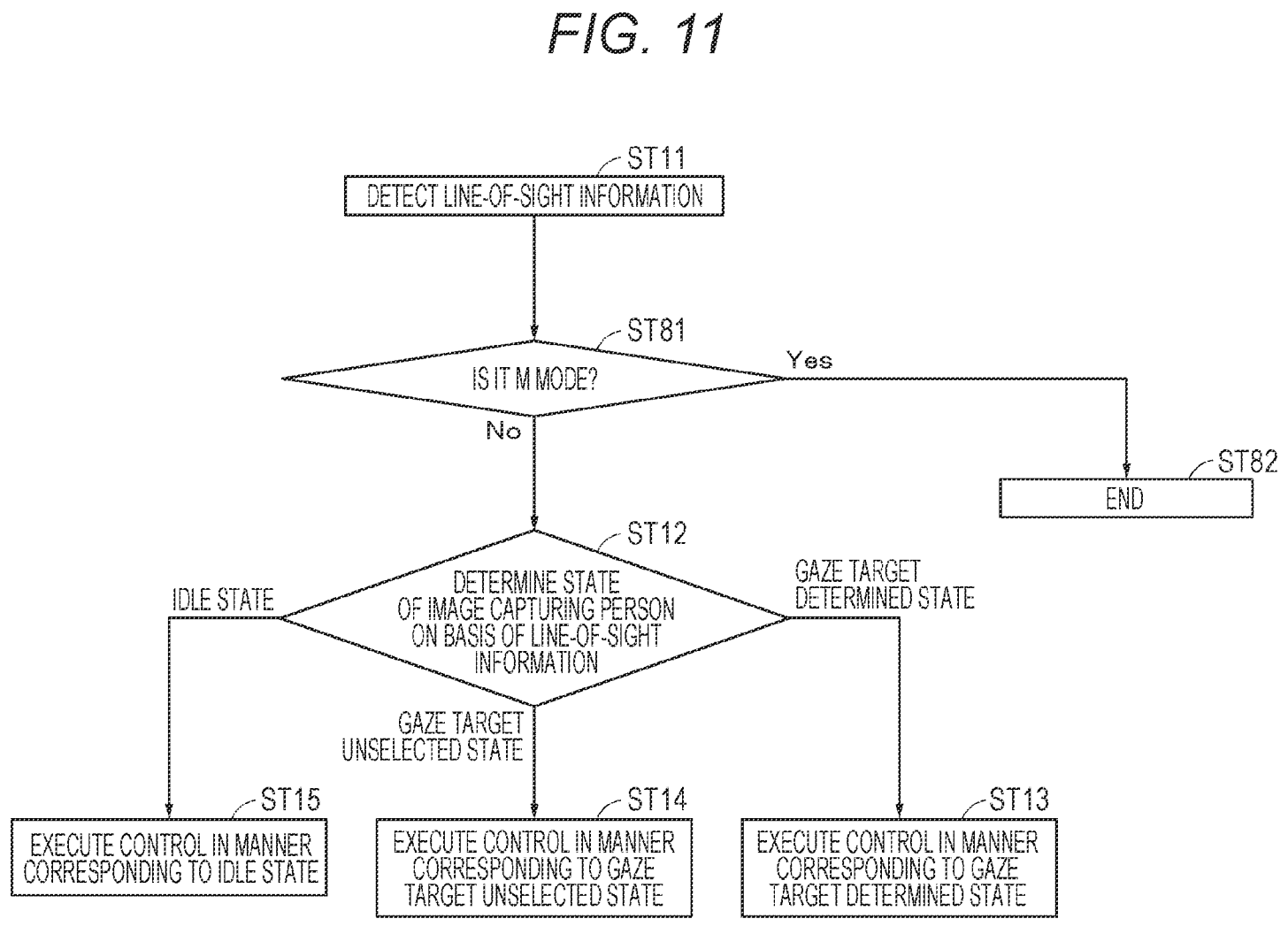

```
                ST11
        ┌──────────────────────────┐
        │ DETECT LINE-OF-SIGHT     │
        │ INFORMATION              │
        └──────────────────────────┘
                     │
                ST81 │
                  ◇──┴──◇
                 ╱        ╲
                ╱ IS IT M  ╲ ──── Yes ────┐
                ╲ MODE?    ╱               │
                 ╲        ╱            ST82 │
                  ◇──┬──◇            ┌──────┐
                  No │               │ END  │
                     │               └──────┘
                ST12 │
                  ◇──┴──◇
                 ╱        ╲
  ┌─IDLE STATE─╱ DETERMINE ╲── GAZE TARGET
  │           ╱  STATE      ╲   DETERMINED STATE
  │          ╱ OF IMAGE      ╲         │
  │          ╲ CAPTURING      ╱        │
  │           ╲ PERSON ON    ╱         │
  │            ╲ BASIS OF    ╱         │
  │             ╲ LINE-OF-  ╱          │
  │              ╲ SIGHT    ╱          │
  │               ╲ INFORM- ╱          │
  │                ╲ ATION  ╱          │
  │                 ◇──┬──◇            │
  │            GAZE TARGET             │
  │            UNSELECTED STATE        │
  │                     │              │
  │                 ST14 │         ST13 │
┌─┴───────────┐  ┌──────┴──────┐  ┌────┴────────┐
│ EXECUTE     │  │ EXECUTE     │  │ EXECUTE     │
│ CONTROL IN  │  │ CONTROL IN  │  │ CONTROL IN  │
│ MANNER      │  │ MANNER      │  │ MANNER      │
│ CORRESPOND- │  │ CORRESPOND- │  │ CORRESPOND- │
│ ING TO IDLE │  │ ING TO GAZE │  │ ING TO GAZE │
│ STATE       │  │ TARGET      │  │ TARGET      │
│        ST15 │  │ UNSELECTED  │  │ DETERMINED  │
│             │  │ STATE       │  │ STATE       │
└─────────────┘  └─────────────┘  └─────────────┘
```

IMAGING APPARATUS, METHOD OF CONTROLLING IMAGING APPARATUS, AND PROGRAM

TECHNICAL FIELD

The present disclosure relates to an imaging apparatus, a control method of the imaging apparatus, and a program.

BACKGROUND ART

An imaging apparatus that performs control according to as operation of an image capturing person is known. For example, Patent Document 1 below describes a technique of monitoring whether or not an image capturing person is looking into a finder and of stopping capturing a moving image in a case where the image capturing person is not looking into the finder.

CITATION LIST

Patent Document

Patent Document 1: Japanese Patent Application Laid-Open No. 2008-306533

SUMMARY OF THE INVENTION

Problems to be Solved by the Invention

As described in Patent Document 1, it is desirable to appropriately perform control on not only a state in which an image capturing person actively performs a predetermined operation but also other states of the image capturing person.

An object of the present disclosure is, for example, to provide an imaging apparatus, a control method of the imaging apparatus, and a program capable of performing appropriate control even in a state (undetermined state) where an image capturing person has not determined a gaze target.

Solutions to Problems

The present disclosure provides, for example, an imaging apparatus including a control unit that executes control in a manner corresponding to the fact that a state of an image capturing person determined on the basis of line-of-sight information is a gaze target undetermined state in which a gaze target has not been determined.

Furthermore, the present disclosure provides, for example, a method of controlling an imaging apparatus, the method including causing a control unit to execute control in a manner corresponding to the fact that a state of an image capturing person determined on the basis of line-of-sight information is a gaze target undetermined state in which a Gaze target has not been determined.

Furthermore, the present disclosure provides, for example, a program for causing a computer to execute a method of controlling an imaging apparatus, the method including causing a control unit to execute control in a manner corresponding to the fact that a state of an image capturing person determined on the basis of line-offsight information is a gaze target undetermined state in which a gaze target has not been determined.

BRIEF DESCRIPTION OF DRAWINGS

FIG. 1 is a block diagram for explaining a configuration example of an imaging apparatus according to an embodiment.

FIG. 10 is a flowchart for explaining a modification.

FIG. 11 is a flowchart for explaining a modification.

MODE FOR CARRYING OUT THE INVENTION

Figure 2:
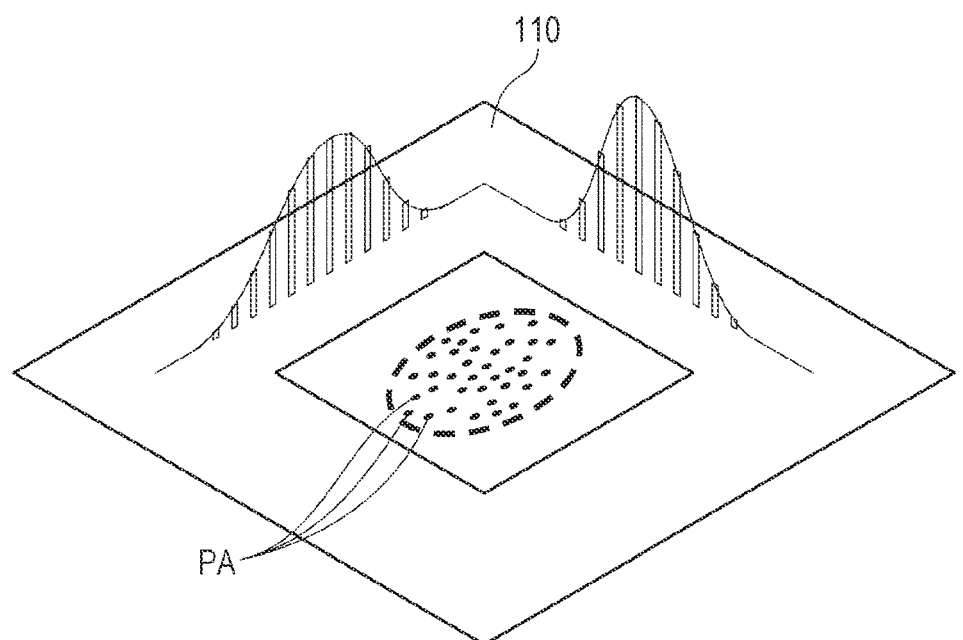
FIG. 2 is a diagram illustrating an example of a distribution of a line-of-sight detection result

Hereinafter, an embodiment and the like of the present disclosure will be described with reference to the drawings. Note that the description will be given in the following order.

One Embodiment

<Modifications>

The embodiment and the like described below are preferred specific examples of the present disclosure, and the contents of the present disclosure are not limited to the embodiment and the like.

One Embodiment

Configuration Example of Imaging Apparatus

Figure 1:
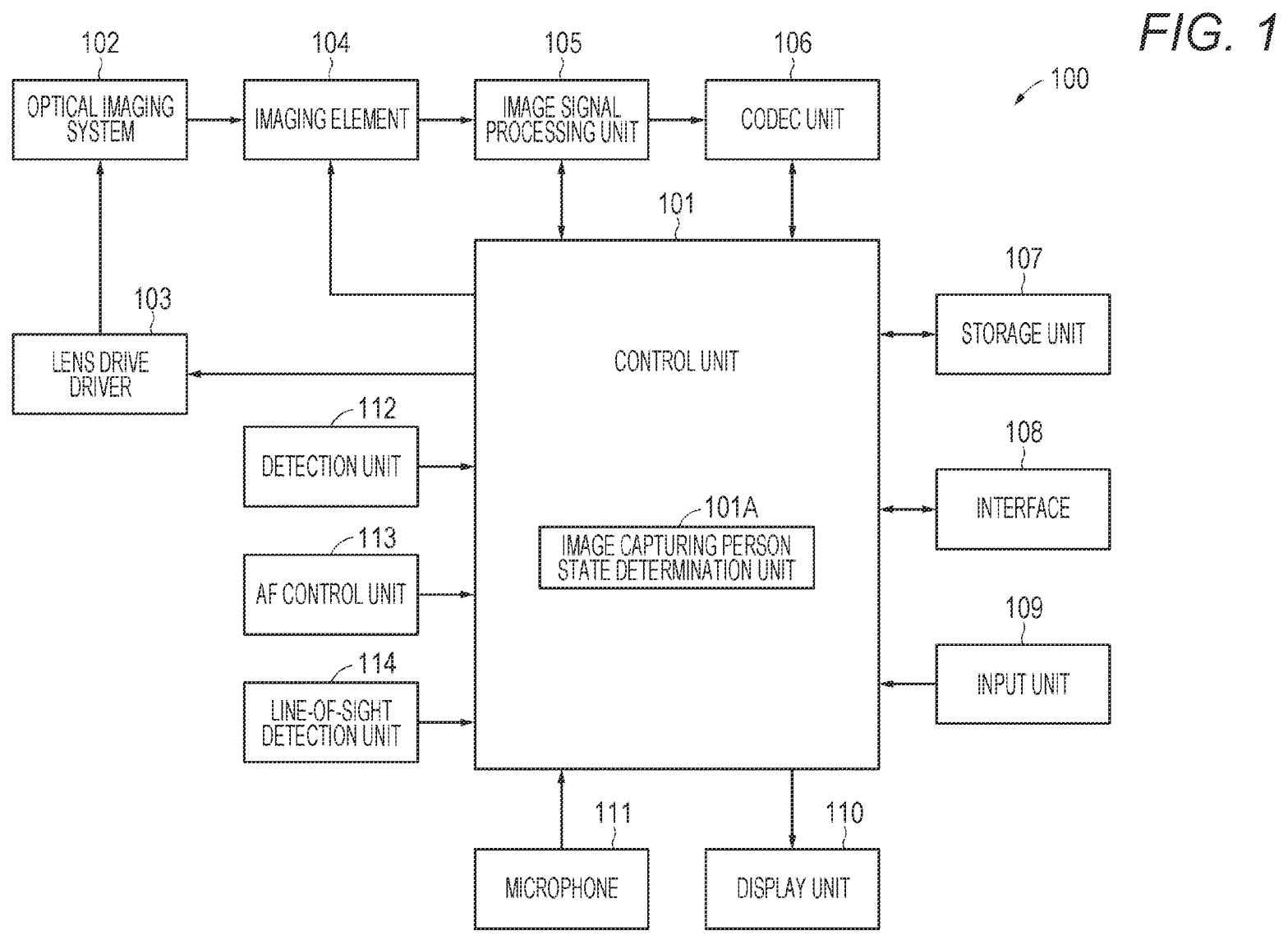

First, a configuration example of an imaging apparatus (imaging apparatus 100) according to the embodiment will be described with reference to FIG. 1. The imaging apparatus 100 includes a control unit 101, an optical imaging system. 102, a lens drive driver 103, an imaging element 104, an image signal processing unit 105, a codec unit 106, a storage unit 107, an interface 108, an input unit 109, a display unit 110, a microphone 111, a detection unit 112, an AF control unit 113, and a line-of-sight detection unit 114. The control unit 101 includes, as a functional block, an image capturing person state determination unit 101A that determines a state of an image capturing person on the basis of line-of-sight information.

The control unit 101 includes a central processing unit (CPU), a random access memory (RAM), a read only memory (ROM), and the like. The CPU executes various processes according to a program stored in the ROM and issues commands, thereby comprehensively controlling the entire imaging apparatus 100 and each of the units. Furthermore, the control unit 101 executes control in a manner corresponding to the fact that a state of the image capturing person determined on the basis of the line-of-sight information is a gaze target undetermined state in which a gaze target has not been determined. Details of the processing performed by the control unit 101 will be described later.

The optical imaging system 102 includes an imaging lens for focusing light from a subject on the imaging element 104, a drive mechanism for moving the imaging lens to perform focusing and zooming, a shutter mechanism, an iris mechanism, and the like. These are driven on the basis of control signals from the control unit 101 and the lens drive driver 103. An optical image of the subject obtained through the optical imaging system 102 is formed on the imaging element 104.

The lens drive driver 103 includes, for example, a microcomputer, and moves the imaging lens by a predetermined amount along an optical axis direction on the basis of focus control information supplied from the AF control unit 113 or an information processing apparatus 200, thereby performing autofocus to focus on the target subject. Furthermore, operations of the drive mechanism, the shutter mechanism, the iris mechanism, and the like of the optical imaging system 102 are controlled under the control of the control unit 101. As a result, the exposure time (shutter speed) and the aperture value (F value) are adjusted.

The imaging element 104 photoelectrically converts incident light from a subject obtained through the imaging lens into a charge amount and outputs an imaging signal. Then, the imaging element 104 outputs a pixel signal to the image signal processing unit 105. As the imaging element 104, a charge coupled device (CCL)), a complementary metal oxide semiconductor (CMOS), or the like is used.

The imaging element 104 includes a red (R) pixel, a green (G) pixel, and a blue (B) pixel that are normal pixels, and a phase difference detection pixel that performs phase difference detection it is possible to perform so-called phase difference autofocus (AF) using phase difference information output from the phase difference detection pixel. Note that the phase difference detection pixel may function only as a phase difference detection pixel and may not function as a normal pixel, or may function for imaging and phase difference detection as one pixel is constituted by two independent photodiodes. Note that the phase difference detection may be performed by an AF sensor dedicated to phase difference detection.

The image signal processing unit 105 performs sample-and-hold for maintaining a high signal/noise (S/N) ratio by correlated double sampling (CDS) processing, auto gain control (AGC) processing, analog/digital (A/D) conversion, and the like on the imaging signal output from the imaging element 104 to create an image signal. Furthermore, the image signal processing unit 105 performs recording processing on the image signal for recording, and performs display processing on the image signal for display.

The codec unit 106 performs encoding processing for, for example, recording and communication on the image signal subjected to the predetermined processing.

The storage unit 107 is, for example, a mass storage medium such as a hard disk or a flash memory. Video data and image data processed by the image signal processing unit 105 and the codec unit 106 are stored in a compressed state or an uncompressed state on the basis of a predetermined standard. Furthermore, an exchangeable image file format (EXIF) including additional information such as information regarding the stored data, imaging position information indicating an imaging position, and imaging time information indicating imaging date and time is also stored in association with the data.

The interface 108 is an interface with another device, the Internet, or the like. The interface 108 may include a wired or wireless communication interface. Furthermore, more specifically, the wired or wireless communication interface may include cellular communication such as 3TTE, Wi-Fi, Bluetooth (registered trademark), near field communication (NEC), Ethernet (registered trademark), High-Definition Multimedia Interface (HDMI) (registered trademark), Universal Serial Bus (USB), and the like.

Note that the imaging apparatus 100 may include a communication unit capable of connecting to the Internet, other devices, and the like, such as a wireless local area network (LAN), a wide area network (WAN), or wireless fidelity (WiFi). Furthermore, communication between the imaging apparatus 100 and an external device may be short-range wireless communication such as near field communication (NFC) or ZigBee (registered trademark), or tethering connection such as WiFi tethering, Universal Serial Bus (USE) tethering, or Bluetooth (registered trademark) tethering.

The input unit 109 is used by the image capturing person to give various instructions to the imaging apparatus 100. When an input is made to the input unit 109 by the image capturing person, a control signal corresponding to the input is generated and supplied to the control unit 101. Then, the control unit 101 performs various processes corresponding to the control signal. Examples of the input unit 109 include a shutter button for shutter input, physical buttons for various operations, a touch panel, a touch screen integrally configured with a display as the display unit 110, and the like.

The display unit 110 is a display device including a display that displays a through image that is a display image signal subjected to display processing, an image/video subjected to recording image processing and stored in the storage unit 107, a graphical user interface (GUI), and the like, an electronic view finder (EVE) display, or the like.

The microphone all is a sound collecting device for recording sound at the time of recording.

The detection unit 112 executes AF detection for determining a focus position using the phase difference information supplied from the imaging element 104 and calculates a defocus amount. The defocus amount is supplied to the AF control unit 113.

The AF control unit 113 generates focus control information indicating which position (for example, XY coordinate information) in the angle of view is focused and how much the lens drive driver 103 of the imaging apparatus 100 moves the lens so as to focus on the target subject on the basis of the defocus amount calculated by the detection unit 112. The focus control information is information for performing autofocus control in the imaging apparatus 100.

The line-of-sight detection unit 114 detects the line of sight of the image capturing person and supplies a result of the detection to the control unit 101.

[Regarding Line-of-Sight Information and Determination of State of Image Capturing Person]

Next, a specific example of processing of detecting the line of sight of the image capturing person who is a user by the line-of-sight detection unit 114 will be described. For example, the line-of-sight detection unit 114 captures an image of the eyes of the image capturing person, and detects the line-of-sight direction of the image capturing person using the image of the eyes. That is, the line-of-sight detection unit 114 includes, for example, a camera unit that captures the eyes of the image capturing person and a unit that detects the line-of-sight direction of the image capturing person. The camera unit may include a light emitting unit that emits infrared light and the like.

As a method of detecting the line-of-sight direction of the image capturing person, a known method can be applied. For example, it is possible to apply a corneal reflection method in which infrared light or the like is emitted from the light emitting unit and reflection from the cornea is used to detect the line-of-sight direction of the image capturing person on the basis of the position of the pupil by a unit that detects the line-of-sight direction. Furthermore, for example, a method of recognizing a point that does not move such as the inner corner of the eye or the outer corner of the eye by image recognition and estimating the line-of-sight direction from the position of the iris of the eye may be applied.

The line-of-sight detection unit 114 is provided in, for example, the EVF of the imaging apparatus 100. The line-of-sight detection unit 114 is provided in, for example, a housing of the imaging apparatus 100. For example, the line-of-sight detection unit 114 may be provided on a surface of the housing of the imaging apparatus 100 on which the display unit 110 is provided.

The line-of-sight direction detected by the line-of-sight detection unit 114 is supplied to the control unit 101.

The image capturing person state determination unit 101A of the control unit 101 generates line-of-sight information from the line-of-sight detection result supplied from the line-of-sight detection unit 114. The line-of-sight information is, for example, information indicating a distribution of the line-of-sight detection result. Specifically, as illustrated in FIG. 2, the line-of-sight information is a distribution of the line-of-sight detection result RA, which is a portion corresponding to the line-of-sight direction detected by the line-of-sight detection unit 114. The line-of-sight information is obtained for each appropriate region AR of the display unit 110. The region AR may be units of pixels or in units of blocks of N pixels×N pixels (N and N are appropriate positive numbers). The image capturing person state determination unit 101A determines the state of the image capturing person on the basis of the distribution of the line-of-sight detection result PA included in the line-of-sight information.

On the basis of the distribution of the line-of-sight detection result. PA, the image capturing person state determination unit 101A determines whether the state of the image capturing person is a state of gazing at a subject, that is, a state (hereinafter, appropriately referred to as a gaze target determined state) in which a subject as a gaze target has been determined, or a state (hereinafter, appropriately referred to as a gaze target undetermined state) in which a gaze target has not been determined yet. In the present embodiment, the image capturing person state determination unit 101A determines whether the state is a state (hereinafter, appropriately referred to as a gaze target unselected state) that is an example of the gaze target undetermined state and in which a gaze target has not been selected, or a state (hereinafter, appropriately referred to as an idle state) that is another example of the gaze target undetermined state and in which the degree of concentration of the image capturing person in image capturing is lower than that in the gaze target undetermined state.

Specific examples in which the state of the image capturing person is the gaze target determined state include a state in which the image capturing person performs image capturing while following a certain subject or performs image capturing in which a desired subject is focused. Furthermore, as a specific example in which the state of the image capturing person is the gaze target unselected state is a state in which it is difficult to determine which one of a certain subject and another subject is focused to capture an image. Specific examples in which the state of the image capturing person is the idle state include a state of the image capturing person who is watching a bird's nest while looking into a finder and waiting for a bird to return to the bird's nest, and a state of the image capturing person during halftime of a football game in image capturing or a scene in which offence and defense change in a baseball game in image capturing.

The image capturing person state determination unit 101 determines whether the state of the image capturing person is any one of the above-described three states on the basis of, for example, the distribution of the line-of-sight detection result PA. For example, as illustrated in FIG. 2, the image capturing person state determination unit 101A obtains a histogram of values of the distribution of the line-of-sight detection result PA corresponding to both an X-axis direction and a Y-axis direction on the display unit 110, and obtains a variance corresponding to each peak thereof. Then, in a case where a peak whose variance is smaller than a predetermined value is present, the image capturing person state determination unit 101A determines that the state of the image capturing person is the gaze target determined state.

Furthermore, in a case where the distribution of the line-of-sight detection result does not have a peak of a variance value smaller than the predetermined value, the image capturing person state determination unit 101A determines that the state of the image capturing person is the gaze target undetermined state. More specifically, in a case where the distribution of the line-of-sight detection result indicated by the line-of-sight information has only a plurality of peaks having variance values larger than the predetermined value, that is, in a case where the variance values of all the peaks are larger than the predetermined value, the image capturing person state determination unit 101A determines that the state of the image capturing person is the gaze target unselected state. In a case where the distribution of the line-of-sight detection result has a variance value larger than the predetermined value, the image capturing person state determination unit 101A determines that the state of the image capturing person is the idle state.

Note that the image capturing person state determination unit 101A may determine the state of the image capturing person on the basis of a trajectory of the user's line of sight detected by the line-of-sight detection unit 114. For example, in a case where a trajectory of the line of sight of the user within a predetermined time falls within a certain range, the image capturing person state determination unit 101A determines that the state of the image capturing person is the gaze target determined state. Furthermore, in a case where the trajectory of the line of sight of the user within the predetermined time reciprocates to a plurality of locations (for example, two or three or more locations may be used) on a display image, the image capturing person state determination unit 101A determines that the state of the image capturing person is the gaze target undetermined state.

Furthermore, in a case where the trajectory of the line-of-sight of the user within the predetermined time is irregularly distributed, the image capturing person state determination unit 101A determines that the state of the user is the idle state. In other words, the idle state is a state of the image capturing person corresponding to the fact that the trajectory of the line-of-sight detection result indicated by the line-of-sight information is wider than that in the gaze, target determined state.

Furthermore, the image capturing person state determination unit 101A may determine the state of the image capturing person on the basis of the number of peaks having sharpness that is equal to or greater than a predetermined value and appears when the histogram of the distribution of the line-of-sight detection result is smoothed. For example, the image capturing person state determination unit 101A determines that the state of the image capturing person is the gaze target determined state in a case where the number of peaks having sharpness is 1, determines that the state of the image capturing person is the gaze target unselected state in a case where the number of peaks having sharpness is within a range of 2 to 4, and determines that the state of the image capturing person is the idle state in a case where the number of peaks having sharpness is 5 or more.

[Flow of Processing]

(Overall Processing Flow)

Figure 3:
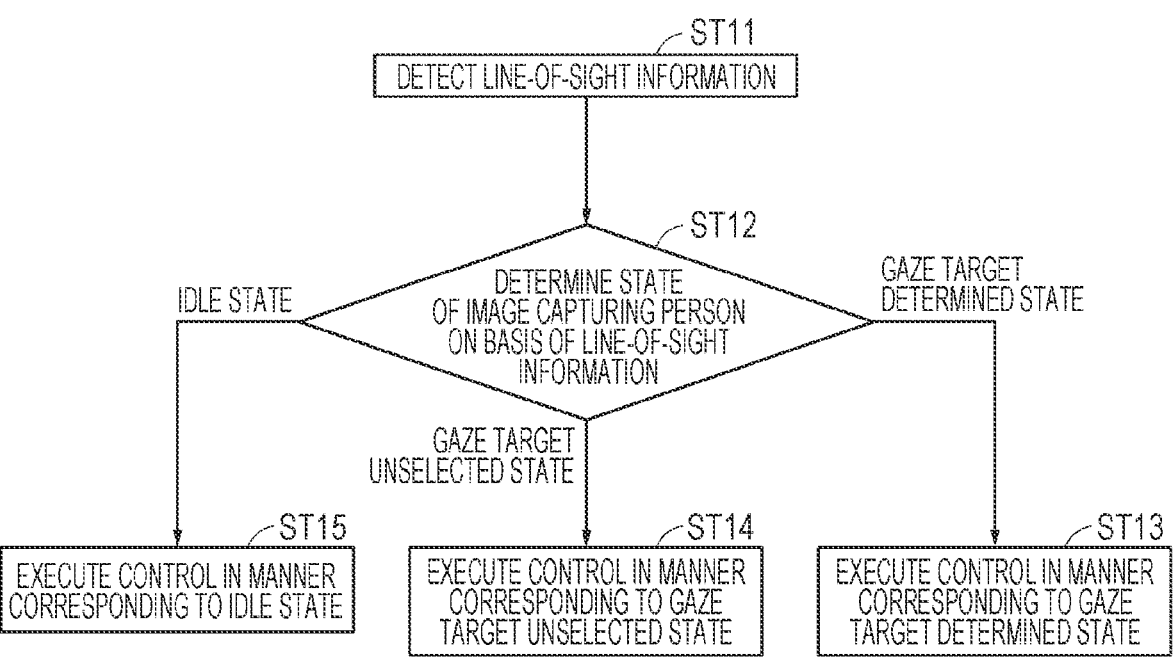
FIG. 3 is a flowchart illustrating a flow of processing performed by the imaging apparatus according to the embodiment.

Next, a flow of processing (entire processing) performed by the imaging apparatus 100 will be described with reference to a flowchart of FIG. 3. The processing described below is performed, for example, when the power supply of the imaging apparatus 100 is turned on or when the mode is shifted to an imaging mode. The processing may be started at a stage where the user is in a position to lift the imaging apparatus 100 and capture an image according to a result of detection by a gyro sensor or a pressure-sensitive sensor. Furthermore, the processing may be started after the line of sight is detected by the line-of-sight detection unit 114. The processing may be repeated while the line of sight is detected. Furthermore, the processing described below is performed by the control unit 101 unless otherwise specified. The same applies to the description of other processing flows is similar.

In step ST11, the image capturing person state determination unit 1011 detects (generates) line-of-sight information on the basis of a result of detecting the line of sight by the line-of-sight detection unit 114. Then, the processing proceeds to step ST12.

In step ST12, the image capturing person state determination unit 101A determines the state of the image capturing person on the basis of the line-of-sight information. In a case where the state of the image capturing person is the gaze target determined state, the processing proceeds to step ST13. In a case where the state of the image capturing person is the gaze target unselected state, the processing proceeds to step ST14. In a case where the state of the image capturing person is the idle state, the processing proceeds to step ST15.

In step ST13, the control unit 101 executes control in a manner corresponding to the state of the image capturing person, that is, the gaze target determined state. The control is control to perform assistance according to the state of the image capturing person, and specific examples thereof include control to display an AF pointer and aligning the AF pointer with the gaze target subject or performing AF on the gaze target subject.

In step ST14, the control unit 101 executes control in a manner corresponding to the state of the image capturing person, that is, the gaze target unselected state. In step ST15, the control unit 101 executes control in a manner corresponding to the state of the image capturing person, that is, the idle state for the gaze target.

(Specific Example of Control Corresponding to Gaze Target Unselected State)

Next, a specific example of control corresponding to the gaze target unselected state will be described. In a case where the state of the image capturing person is the gaze target unselected state, the control unit 101 determines a focus region such that the focus region includes the target subject. Note that including the target subject means including at least a part of the target subject. Furthermore, determining the focus region means determining a partial region in the display unit 110 as the focus region. Furthermore, the subject is a subject recognized by known image recognition processing. For example, the control unit 101 determines the target subject on the basis of the imaging situation before the state of the image capturing person becomes the gaze target unselected state. As an example, the control unit 101 determines the target subject on the basis of a subject that was the gaze target before the state of the image capturing image became the gaze target unselected state. Note that a subject occupying the largest area or a subject with the largest motion in the display image currently displayed on the display unit 110 may be determined as the target subject.

Figure 4:
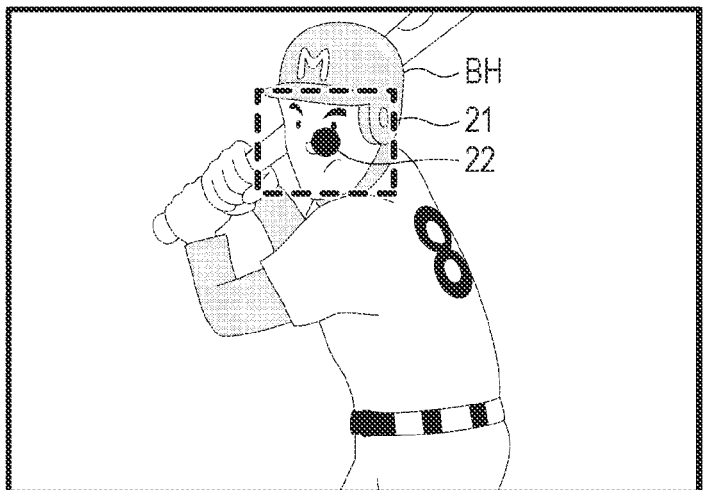
FIGS. 4A to 4C are diagrams for explaining an example of control performed in a case where a state of an image capturing person is a gaze target unselected state.
Figure 4:
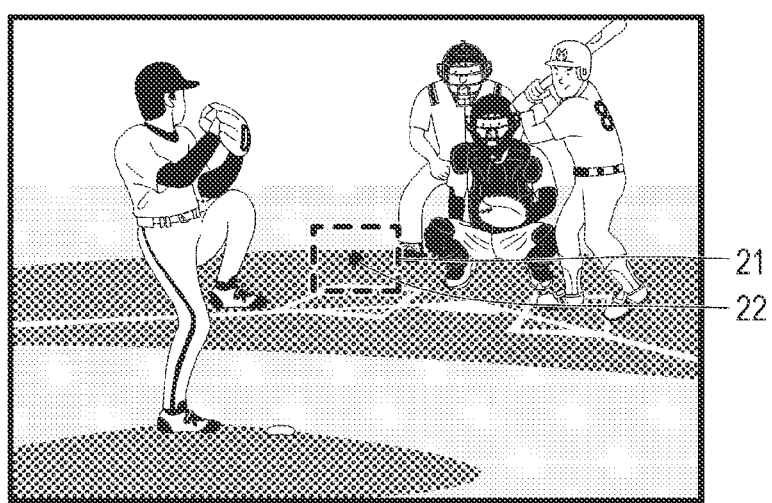
Figure 4:
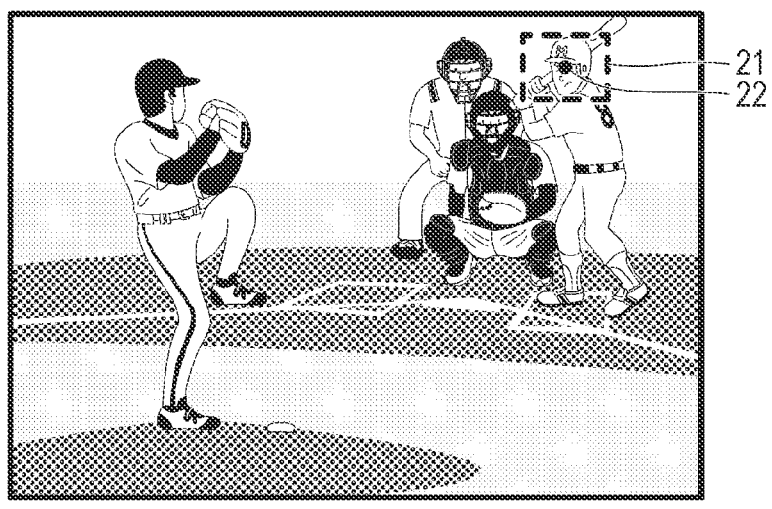

A specific example will be described with reference to FIG. 4. FIG. 4A is a diagram illustrating an example (an example of a display image displayed on the display unit 110) of a captured image obtained in a state in which the state of the image capturing person is the gaze target determined state. As illustrated in FIG. 4A, the image capturing person gazes at a batter BH as a gaze target subject. The AF control unit 113 is controlled so that the face of the batter BH is in focus. An AF frame 21 and an AR pointer 22 are displayed on the face of the batter BH.

Here, it is assumed that the captured image is changed from the captured image illustrated in FIG. 4A to the captured image illustrated in FIG. 4B by changing the angle of view. In this case, the display position of the batter BH to be subjected to AF changes as the angle of view changes. In the captured image illustrated in FIG. 4B, the image capturing person is in a state of hesitation as to which subject to focus on, that is, the state of the image capturing person is the gaze target unselected state. Normally, since it is assumed that the image capturing person wants to keep focusing on the target (the face of the batter BH in this example) at which the image capturing person has been gazing, the control unit 101 controls the AF control unit 113 so that the focus is on the face of the batter BH. According to such control, as illustrated in FIG. 4C, the AF frame 21 and the AF pointer 22 are displayed on the face of the batter BH.

Figure 5:
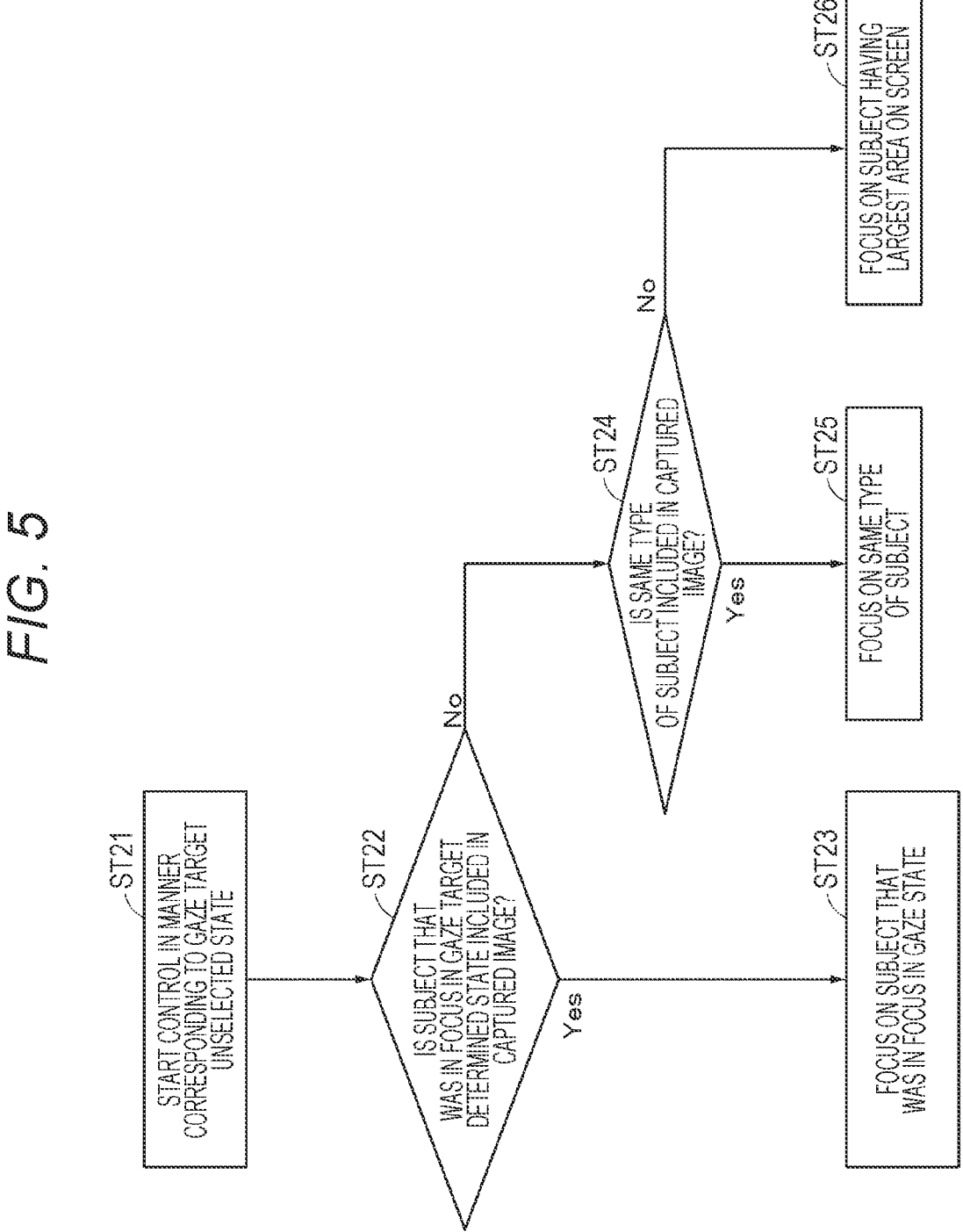
FIG. 5 is a diagram for explaining an example of a flow of control performed in a case where the state of the image capturing person is the gaze target unselected state.

Next, an example of a flow of control (processing) corresponding to the gaze target unselected state will be described with reference to a flowchart of FIG. 5. The processing described below is performed, for example, in a case where the image capturing person state determination unit 101A determines that the state of the image capturing person is the gaze target unselected state. Furthermore, the processing described below may be repeated while the line of sight is detected.

In step ST21, the control unit 101 starts control in a manner corresponding to a case where the state of the image capturing person is the gaze target unselected state. Then, the processing proceeds to step ST22.

In step ST22, it is determined whether or not a subject (target subject in this example) that was in focus in the gaze target determined state is included in the current captured image. In a case where the subject in focus is included (Yes), the processing proceeds to step ST23.

In step ST23, control is performed to focus on the subject that was in focus in the gaze target determined state. The processing from step ST22 to step ST23 is the processing described above with reference to FIGS. 4A to 4C.

In the determination processing of step ST22, in a case where the subject that was in focus in the gaze target determined state is not included in the current captured image (No), the processing proceeds to step ST24.

In step ST24, it is determined whether or not the same type of subject as the subject that was in focus the gaze target determined state is included in the current captured image by performing the subject recognition processing and the like. In a case where the same type of subject is included (Yes), the processing proceeds to step ST25.

In step ST25, the same type of subject as the subject that was in focus in the gaze target determined state is determined as the target subject, and control is performed to focus on the subject.

In the determination processing of step ST24, in a case where the same type of subject as the target that was in focus in the gaze target determined state is not included in the current captured image (No), the processing proceeds to step ST26.

In step ST26, a subject having the largest area among subjects currently displayed on the display unit 110 is determined as the target subject, and control is performed to focus on the subject.

As a specific example of the processing relating to step ST24, for example, in a case where an image in which a plurality of persons and a plurality of horses are mixed in a horse race is to be captured, and the state of the image capturing person becomes the gaze target unselected state, it is determined whether or not the type (for example, the type of animals including persons, the attribute type of persons such as gender and race, and the type of objects such as desks, houses, and balls) focused before the state becomes the gaze target unselected state is included in the current captured image. In a case where a person is included, control is performed to focus on the person. In a case where no person is included, control is performed to focus on a subject (for example, a horse) having a large area.

Note that the control unit 101 may highlight the displayed target subject in a case where the state of the image capturing person is the gaze target unselected state. Examples of the highlighted display include a display mode in which the luminance of the target subject is increased, the luminance around the target subject is decreased, the target subject is blinked, and a mark is displayed on or near the target subject. (Specific Example of Control Corresponding to Idle State)

Next, a specific example of control corresponding to the gaze target unselected state will be described. In a case where it is determined that the state of the image capturing person is the idle state, for example, control is performed to set the imaging apparatus 100 to a power saving mode by stopping a part of the functions or reducing the performance. For example, the display frame rate of the EVF display is lowered to switch the imaging apparatus 100 to the power saving mode. Furthermore, in a case where the state of the image capturing person is the idle state, a scene in which the image capturing person is looking for a subject in image capturing of sports in which many players play is assumed. Therefore, in order to make it easy to capture the subject, control is performed to widen the distance measurement range and automatically widen the focus region (focus wide mode). Furthermore, in a case where the state of the image capturing person changes from a state (for example, the gaze target determined state or the gaze target unselected state) other than the idle state to the idle state, the angle of view may be made wider than the angle of view in the state other than the idle state. Furthermore, in a case where the state of the image capturing person is the idle state where the degree or concentration is low, there is a possibility that an important scene is missed in the idle state. Therefore, control (image storage control) is performed to automatically store images continuously captured by image capturing in a buffer memory. Hereinafter, the control corresponding to the idle state will be described more specifically.

First Example

Figure 6:
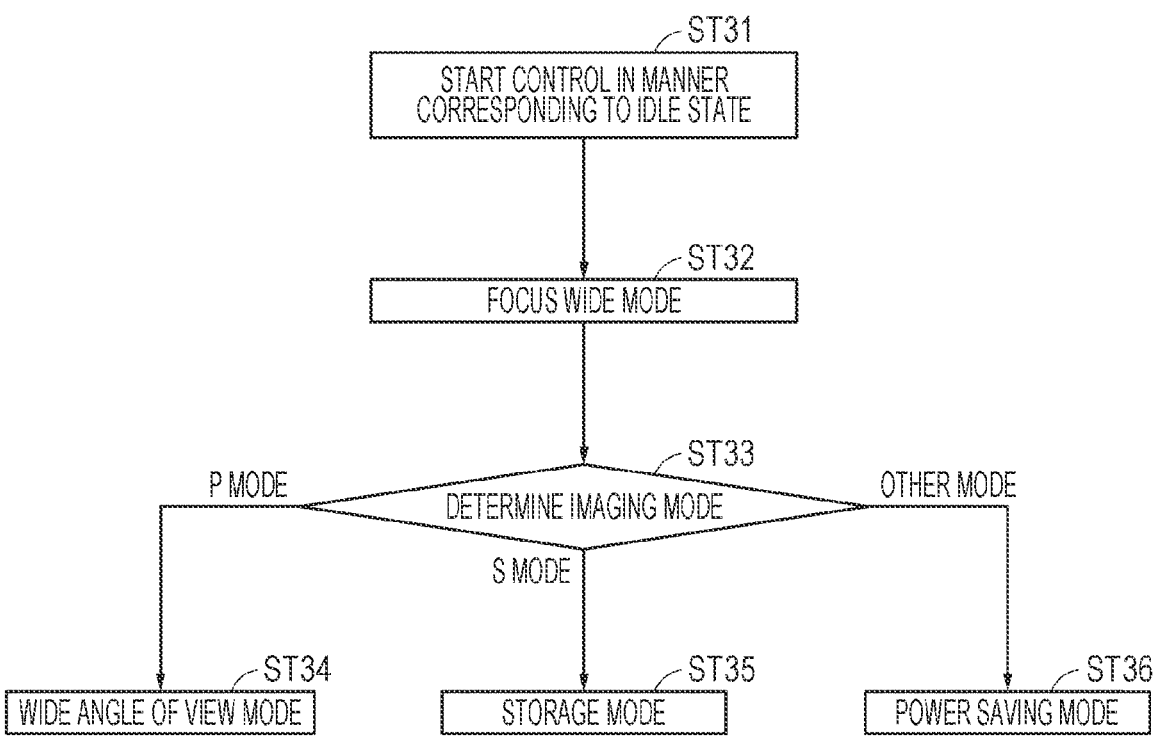
FIG. 6 is a diagram for explaining an example of a flow of control performed in a case where the state of the image capturing person is an idle state.

FIG. 6 is a flowchart illustrating a first example of a flow of the control corresponding to the idle state. The first example is an example in which the control unit 101 selects a control method corresponding to an imaging situation from among a plurality of control methods in a case where the state of the image capturing person is the idle state, and more specifically, is an example in which a control method corresponding to the imaging mode is selected as the imaging situation from among the plurality of control methods. Note that processing described below may be repeated while the line of sight is detected.

In step ST31, the image capturing person state determination unit 101A determines that the state of the image capturing person is the idle state, and the control unit 101 starts control in a manner corresponding to the idle state. Then, the processing proceeds to step ST32.

In step ST32, control is performed to widen the distance measurement range and automatically widen the focus region, and the setting of the imaging apparatus 100 is set to the focus wide mode. Note that the focus wide mode is not necessarily set (the same applies to other examples). Then, the processing proceeds to step ST33.

In step ST33, the imaging mode of the imaging apparatus 100 is determined. Here, in a case where the imaging mode is a program auto mode (hereinafter, appropriately referred to as a P mode), the processing proceeds to step ST34. In a case where the imaging mode is a shutter speed priority mode (hereinafter, appropriately referred to as an S mode), the processing proceeds to step ST35. In a case where the imaging mode is any other mode (for example, an auto mode), the processing proceeds to step ST36.

In step ST34, control is performed to set a wide angle of view mode for widening the angle of view so that image capturing is performed at a wider angle of view. Since the P mode is generally set in a case where the image capturing person is a beginner or an armature, the wide angle of view mode is set to assist such an image capturing person.

In step ST35, control is performed to set a storage mode for storing images continuously captured by image capturing in the buffer memory (for example, a ring buffer). In a case where the mode is the S mode, since a scene in which an image of a subject with a relatively fast motion is captured is assumed, the storage mode is set so as not to miss a decisive scene. The buffer length of the ring buffer may be increased according to a time period of the idle state.

In step ST36, control is performed to set the power saving mode for reducing power consumption in the imaging apparatus 100. Specific examples of the power saving mode include, in addition to the above-described control, control to limit a band for output from the imaging element 104, control to reduce the luminance of the display unit 110, and the like.

Second Example

Figure 7:
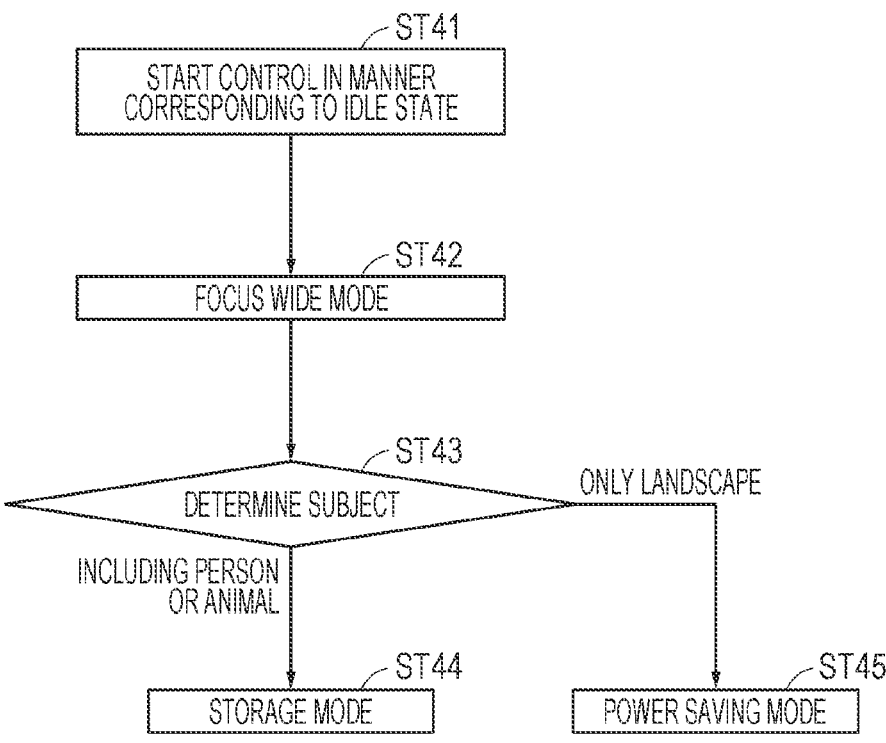
FIG. 7 is a diagram for explaining another example of a flow of control performed in a case where the state of the image capturing person is the idle state.

FIG. 7 is a flowchart illustrating a second example of a flow of control corresponding to the idle state. The second example is an example in which the control unit 101 selects a control method corresponding to an imaging situation from among a plurality of control methods in a case where the state of the image capturing person is the idle state, and more specifically, is an example in which a control method corresponding to the type of a subject is selected as the imaging situation from among the plurality of control methods. Note that processing described below may be repeated while the line of sight is detected.

In step ST41, the image capturing person state determination unit 101A determines that the state of the image capturing person is the idle state, and the control unit 101 starts control in a manner corresponding to the idle state. Then, the processing proceeds to step ST42.

In step ST42, control is performed to widen the distance measurement range and automatically widen the focus region, and the setting of the imaging apparatus 100 is set to the focus wide mode. Then, the processing proceeds to step ST43.

In step ST43, the subject recognition processing is performed to determine the subject. In a case where the subject includes a moving subject (for example, a person, an animal, a vehicle, or the like), the processing proceeds to step ST44. In a case where the subject (for example, only a landscape) does not include a moving subject, the processing proceeds to step ST45.

In step ST44, since the subject includes the moving subject, control performed to set the storage mode so as not to miss a decisive scene. On the other hand, in step ST45, since a moving subject is not included, control is performed to set the power saving mode.

Third Example

Figure 8:
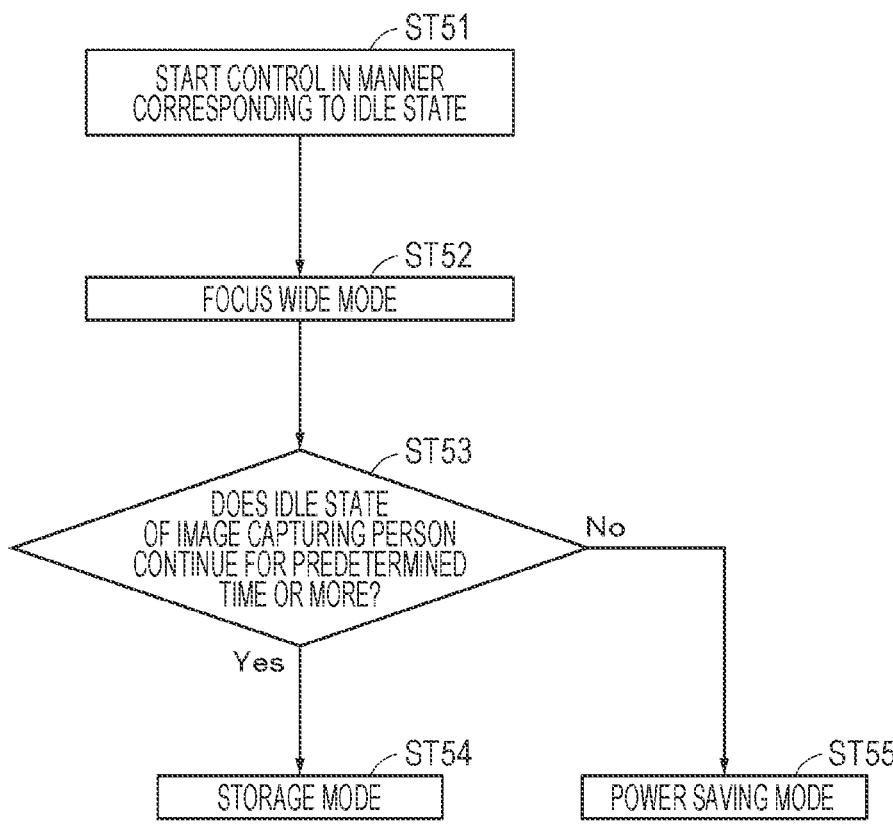
FIG. 8 is a diagram for explaining another example of a flow of control performed in a case where the state of the image capturing person is the idle state.

FIG. 8 is a flowchart illustrating a third example of a flow of control corresponding to the idle state. The third example is an example in which the control unit 101 selects a control method corresponding to the duration of the idle state from among a plurality of control methods in a case where the state of the image capturing person is the idle state. Note that processing described below may be repeated while the line of sight is detected.

In step ST51, the image capturing person state determination unit 101A determines that the state of the image capturing person is the idle state, and the control unit 101 starts control in a manner corresponding to the idle state. Then, the processing proceeds to step ST52.

In step ST52, control is performed to widen the distance measurement range and automatically widen the focus region, and the setting of the imaging apparatus 100 is set to the focus wide mode. Then, the processing proceeds to step ST53.

In step ST53, it is determined whether or not a state in which the state of the image capturing person is the idle state continues for a predetermined time (for example, 1 minute to several minutes) or more. If the state continues (Yes), the processing proceeds to step ST54. If the state does not continue (No), the processing proceeds to step ST55.

In step ST54, control is performed to set the storage mode in the imaging apparatus 100. In step ST55, control is performed to set the power saving mode in the imaging apparatus 100.

As a specific situation of this example, for example, capturing an image of a bird or a wild animal is assumed. In a case where the person is a professional photographer who waits for an animal, it is detected that the user is looking at the finder and the line of sight is present, but the line of sight is not concentrated, that is, the state is the idle state. In a case where some time (for example, 1 minute or more) has passed in the idle state, control is performed to set the storage mode on the assumption that the user waits for an animal, not knowing when the animal will arrive at the location. On the other hand, in a case where the idle state does not continue, control is performed to set the power saving mode on the assumption that the user is not waiting.

Fourth Example

Figure 9:
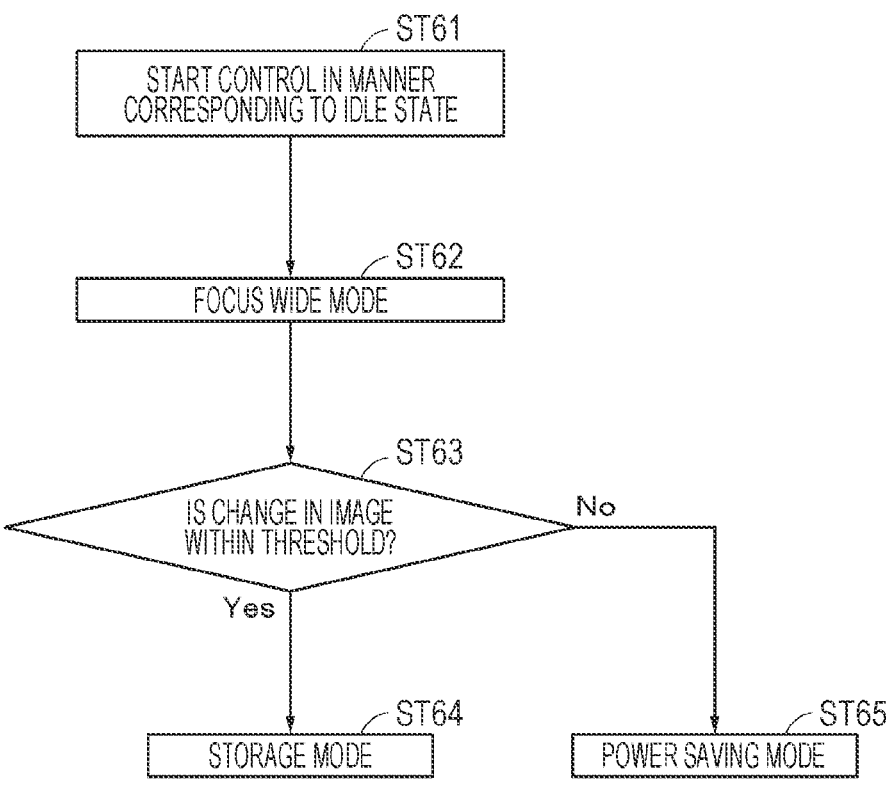
FIG. 9 is a diagram for explaining another example of a flow of control performed in a case where the state of the image capturing person is the idle state.

FIG. 9 is a flowchart illustrating a fourth example of a flow of control corresponding to the idle state. The fourth example is an example in which the control unit 101 selects a control method corresponding to an imaging situation from among a plurality of control methods in a case where the state of the image capturing person is the idle state, and more specifically, is an example in which a control method corresponding to a change in a captured image is selected as the imaging situation from among the plurality of control methods. Note that processing described below may be repeated while the line of sight is detected.

In step ST61, the image capturing person state determination unit 101A determines that the state of the image capturing person is the idle state, and the control unit 101 starts control in a manner corresponding to the idle state. Then, the processing proceeds to step ST62.

In step ST62, control is performed to widen the distance measurement range and automatically widen the focus region, and the setting of the imaging apparatus 100 is set to the focus wide mode. Then, the processing proceeds to step ST63.

In step ST63, it is determined whether or not the change in the image is within a threshold. The change in the image is determined on the basis of, for example, a correlation between the current frame and a past frame (for example, a frame temporally preceding the current frame by one frame). In a case where the correlation is equal to or greater than a certain level, it is determined that the change in the image is within the threshold. In a case where the correlation is less than the certain level, it is determined that the change in the image is greater than the threshold. In a case where the change in the image is within the threshold (Yes), the processing proceeds to step ST64. Furthermore, in a case where the change in the image is larger than the threshold, the processing proceeds to step ST65.

In step ST64, control is performed to set the storage mode in the imaging apparatus 100. In step ST65, control is performed to set the power saving mode in the imaging apparatus 100.

As a specific situation of this example, for example, capturing an image of a bird or a wild animal is assumed as in the third example described above. In a case where the person is a professional photographer who waits for an animal, it is detected that the user is looking at the finder and the line of sight is present, but the line of sight is not concentrated, that is, the state is the idle state. Under such a situation, in general, a landscape being captured is mostly captured, and a change in the image is small. Therefore, in a case where the change in the image is small, control is performed to set the storage mode in order not to miss a decisive scene (for example, a scene in which an animal is captured). On the other hand, in a case where the change in the image is large, it is determined that the situation is not the above-described situation, and control is performed to set the power saving mode.

According to the present embodiment described above, it is possible to perform appropriate control not only in a state where the image capturing person actively performs a predetermined operation but also in a case where the image capturing person is in another state, specifically, the state of the image capturing person is the gaze target unselected state or the idle state.

<Modifications>

Although the one embodiment of the present disclosure has been specifically described above, the contents of the present disclosure are not limited to the above-described embodiment, and various modifications based on the technical idea of the present disclosure are possible.

In the above-described embodiment, there may be a case where control is not performed in a manner corresponding to the state of the image capturing person determined on the basis of the line-of-sight information. FIG. 10 is a flowchart illustrating a flow of processing performed in such a case. Note that description of contents overlapping with the contents described in 3 will be omitted as appropriate.

After the processing of step ST11, processing relating to step ST71 is performed. In step ST71, it is determined whether or not the image capturing person is operating a setting of the imaging apparatus 100. Examples of the operation of the setting include an operation of a setting relating to the shutter speed and ISO sensitivity. Whether or not the setting of the imaging apparatus 100 is being operated can be determined on the basis of the presence or absence of an operation signal generated according to the operation or a result of sensing by a sensor provided in the input unit 109 that is a dial and the like.

In a case where the setting is being operated in step ST71 (Yes), the processing proceeds to step ST72, and the series of processes ends. In a case where the setting is not being operated in step ST71 (No), the processing proceeds to step ST12. Since the processing after step ST12 has already been described, redundant description will be omitted.

When the image capturing person performs an active setting operation, control according co the state of the image capturing person is performed, and setting according to the control is performed, there is a possibility that the setting is different from the setting intended by the image capturing person. In the present example, since it is determined whether or not the operation relating to the setting is being performed, it is possible to avoid the above-described inconvenience.

FIG. 11 is a flowchart illustrating a flow of processing performed in another case where control according to the state of the image capturing person determined on the basis of the line-of-sight information is not performed. After the processing of step ST11, processing relating to step ST81 is performed.

In step ST81, it is determined whether or not the node of the imaging apparatus 100 is a manual mode (hereinafter, appropriately referred to as an M mode). In a case where the mode of the imaging apparatus 100 is the M mode (Yes), the processing proceeds to step ST82, and the series of processing ends. In a case where the mode of the imaging apparatus 100 is not the M mode (No), the processing proceeds to step ST12. Since the processing after step ST12 has already been described, redundant description will be omitted.

In a case where the image capturing person is an advanced-level person, there may be a case where it is not desired to perform control in a manner corresponding to the state of the image capturing person. In this case, the image capturing person can avoid the above-described inconvenience by setting the mode of the imaging apparatus 100 to the M mode. Note that not only the M mode but also a dedicated mode in which control according to the state of the image capturing person is not performed may be settable.

In the above-described embodiment, a temporal element may be considered in determining the state of the image capturing person. For example, even in a case where it is determined that the state of the image capturing person is the idle state on the basis of the line-of-sight information, control according to the idle state may be started in a case where the state continues for a predetermined time (for example, five seconds) or more.

Note that, in the above-described embodiment, the image capturing person state determination unit 101A may determine any one of the states of the image capturing person.

In the processing according to the above-described embodiment, processing based on machine learning, that is, processing using a learning model obtained by learning performed in advance may be performed.

The configurations, methods, steps, shapes, materials, numerical values, and the like described in the above-described embodiment and modifications are merely examples, and configurations, methods, steps, shapes, materials, numerical values, and the like different from those described above may be used as necessary, or the configurations, methods, steps, shapes, materials, numerical values, and the like described in the above-described embodiments and modifications may be replaced with known ones. Furthermore, the configurations, methods, steps, shapes, materials, numerical values, and the like in the embodiment and the modifications can be combined with each other within a range in which no technical contradiction occurs.

Note that the contents of the present disclosure are not to be construed as being limited by the effects exemplified in the present specification.

The present disclosure can also adopt the following configurations.

(1)

An imaging apparatus including a control unit that executes control in a manner corresponding to the fact that a state of an image capturing person determined on the basis of line-of-sight information is a gaze target undetermined state in which a gaze target has not been determined.

(2)

The imaging apparatus described in (1), in which the gaze target undetermined state is a state of the image capturing person corresponding to the fact that a distribution of a line-of-sight detection result indicated by the line-of-sight information does not have a peak of a variance value smaller than a predetermined value.

(3)

The imaging apparatus described in (1) or (2), in which the control unit determines a state of the image capturing person on the basis of the line-of-sight information.

(4)

The imaging apparatus described is any one of (1) to (3), in which in a case where the state of the image capturing person is a gaze target unselected state in which the gaze target has not been selected and that is the gaze target undetermined state, the control unit determines a focus region such that the focus region includes a target subject.

(5)

The imaging apparatus described in (4), in which in a case where the state of the image capturing person is the gaze target unselected state, the control unit determines the target subject on the basis of an imaging situation before the state of the image capturing person becomes the gaze target unselected state.

(6)

The imaging apparatus described in (5), in which the control unit determines the target subject on the basis of a subject that was the gaze target before the state of the image capturing person became the gaze target unselected state.

(7)

The imaging apparatus described in any one of (4) to (6), in which the gaze target unselected state is a state of the image capturing person corresponding to the fact that a distribution of a line-of-sight detection result indicated by the line-of-sight information has only a plurality of peaks of a variance value larger than a predetermined value.

(8)

The imaging apparatus described in any one of (4) to (6), in which the gaze target unselected state is a state of the image capturing person corresponding to the fact that a trajectory of a line-of-sight detection result indicated by the line-of-sight information reciprocates to a plurality of locations on a display image.

(9)

The imaging apparatus described in any one of (1) to (8), in which in a case where the state of the image capturing person is an idle state that is the undetermined state, when the state of the image capturing person is changed from a state other than the idle state to the idle state, the control unit makes an angle of view wider than in the state other than the idle state.

(10)

The imaging apparatus described in any one of (1) to (8), in which in a case where the state of the image capturing person is an idle state that is the undetermined state, the control unit performs power saving control.

(11)

The imaging apparatus described in any one of (1) to (8), in which in a case where the state of the image capturing person is an idle state that is the undetermined state, the control unit performs image storage control.

(12)

The imaging apparatus described in any one of (1) to (8), in which in a case where the state of the image capturing person is an idle state that is the undetermined state, when the state of the image capturing person is changed from a state other than the idle state to the idle state, the control unit makes a distance measurement range wider than in the state other than the idle state.

(13)

The imaging apparatus described in any one of (1) to (8), in which in a case where the state of the image capturing person is an idle state, the control unit selects a control method corresponding to an imaging situation from among a plurality of control methods.

(14)

The imaging apparatus described in (13), in which in a case where the state of the image capturing person is the idle state, the control unit selects a control method corresponding to an imaging mode as the imaging situation from among the plurality of control methods.

(15)

The imaging apparatus described in (13), in which in a case where the state of the image capturing person is the idle state, the control unit selects a control method corresponding to the type of a subject as the imaging'situation from among the plurality of control methods.

(16)

The imaging apparatus described in (13), in which in a case where the state of the image capturing person is the idle state, the control unit selects a control method corresponding to a duration of the idle state as the imaging situation from among the plurality of control methods.

(17)

The imaging apparatus described in any one of to (16), in which the idle state is a state of the image capturing person corresponding to the fact that a distribution of a line-of-sight detection result indicated by the line-of-sight information has a variance value larger than a predetermined value.

(18)

The imaging apparatus described in any one of to (16), in which the idle state is a state of the image capturing person corresponding to the fact that a trajectory of a line-of-sight detection result indicated by the line-of-sight information is wider than in a gaze target determined state in which the gaze target has been determined.

(19)

A method of controlling an imaging apparatus, the method including causing a control unit to execute control in a manner corresponding to the fact that a state of an image capturing person determined on the basis of line-of-sight information is a gaze target undetermined state in which a gaze target has not been determined.

(20)

A program for causing a computer to execute a method of controlling an imaging apparatus, the method including causing a control unit to execute control in a manner corresponding to the fact that a state of an image capturing person determined on the basis of line-off-sight information is a gaze target undetermined state in which a gaze target has not been determined.

REFERENCE SIGNS LIST

100 Imaging apparatus
101 Control unit
101A Image capturing person state determination unit
114 Line-of-sight detection unit

The invention claimed is:

1. An imaging apparatus comprising:
a memory storing program code, and a processor configured to execute the program code to perform operations comprising:

generate line-of-sight information based on a result of detecting a line of sight of an image capturing person;

ascertaining whether a gaze target of an image capturing person is determined on a basis of the line-of-sight information;

applying a gaze target undetermined state where it is ascertained, based on the line-of-sight information, that the gaze target of the image capturing person is not determined, wherein the gaze target undetermined state is applied when it is determined that a gaze target unselected state is present, the gaze target unselected state being a state in which it is undetermined which one of multiple candidate target subjects is the gaze target;

determining a focus region to include a target subject when the gaze target undetermined state is applied; and determining the target subject on a basis of an imaging situation during a prior gaze target determined state, wherein the imaging situation is a subject type of a prior target subject of the prior gaze target determined state.

2. The imaging apparatus according to claim 1, wherein the operations further comprise:

applying the gaze target undetermined state when distribution of a line-of-sight detection result indicated by the line-of-sight information does not have a peak of a variance value smaller than a predetermined value.

3. The imaging apparatus according to claim 1, wherein the operations further comprise:

determining the target subject on a basis of a subject that was the gaze target during the prior gaze target determined state.

4. The imaging apparatus according to claim 1, wherein the gaze target unselected state is a state of the image capturing person corresponding to a fact that a distribution of a line-of-sight detection result indicated by the line-of-sight information has only a plurality of peaks of a variance value larger than a predetermined value.

5. The imaging apparatus according to claim 1, wherein the gaze target unselected state is a state of the image capturing person corresponding to a fact that a trajectory of a line-of-sight detection result indicated by the line-of-sight information reciprocates to a plurality of locations on a display image.

6. The imaging apparatus according to claim 1, wherein the operations further comprise:

in a case where the state of the image capturing person is an idle state that is the undetermined state, when the state of the image capturing person is changed from a state other than the idle state to the idle state, making an angle of view wider than in the state other than the idle state.

7. The imaging apparatus according to claim 1, wherein the operations further comprise:

in a case where the state of the image capturing person is an idle state that is the undetermined state, performing power saving control.

8. The imaging apparatus according to claim 1, wherein the operations further comprise:

in a case where the state of the image capturing person is an idle state that is the undetermined state, performing image storage control.

9. The imaging apparatus according to claim 1, wherein the operations further comprise:

in a case where the state of the image capturing person is an idle state that is the undetermined state, when the state of the image capturing person is changed from a state other than the idle state to the idle state, making a distance measurement range wider than in the state other than the idle state.

10. The imaging apparatus according to claim 1, wherein the operations further comprise:

in a case where the state of the image capturing person is an idle state, selecting a control method corresponding to an imaging situation from among a plurality of control methods.

11. The imaging apparatus according to claim 10, wherein the operations further comprise:

in a case where the state of the image capturing person is the idle state, selecting a control method corresponding to an imaging mode as the imaging situation from among the plurality of control methods.

12. The imaging apparatus according to claim 10, wherein the operations further comprise:

in a case where the state of the image capturing person is the idle state, selecting a control method corresponding to a type of a subject as the imaging situation from among the plurality of control methods.

13. The imaging apparatus according to claim 10, wherein the operations further comprise:

in a case where the state of the image capturing person is the idle state, selecting a control method corresponding to a duration of the idle state as the imaging situation from among the plurality of control methods.

14. The imaging apparatus according to claim 6, wherein the idle state is a state of the image capturing person corresponding to a fact that a distribution of a line-of-sight detection result indicated by the line-of-sight information has a variance value larger than a predetermined value.

15. The imaging apparatus according to claim 6, wherein the idle state is a state of the image capturing person corresponding to a fact that a trajectory of a line-of-sight detection result indicated by the line-of-sight information is wider than in a gaze target determined state in which the gaze target has been determined.

16. The imaging apparatus of claim 1, wherein the subject type is one of a landscape, an animal, or an object.

17. A method of controlling an imaging apparatus, the method comprising generate line-of-sight information based on a result of detecting a line of sight of an image capturing person;

ascertaining whether a gaze target of an image capturing person is determined on a basis of the line-of-sight information;

applying a gaze target undetermined state where it is ascertained, based on the line-of-sight information, that the gaze target of the image capturing person is not determined, wherein the gaze target undetermined state is applied when it is determined that a gaze target unselected state is present, the gaze target unselected state being a state in which it is undetermined which one of multiple candidate target subjects is the gaze target;

determining a focus region to include a target subject when the gaze target undetermined state is applied; and, determining the target subject on a basis of an imaging situation during a prior gaze target determined state, wherein the imaging situation is a subject type of a prior target subject of the prior gaze target determined state.

18. The method of claim 17, wherein the subject type is one of a landscape, an animal, or an object.

19. A non-transitory computer readable medium storing a program for controlling an imaging apparatus, the program being executable by a processor to perform operations comprising:

generate line-of-sight information based on a result of detecting a line of sight of an image capturing person;

ascertaining whether a gaze target of an image capturing person is determined on a basis of the line-of-sight information;

applying a gaze target undetermined state where it is ascertained, based on the line-of-sight information, that the gaze target of the image capturing person is not determined, wherein the gaze target undetermined state is applied when it is determined that a gaze target unselected state is present, the gaze target unselected state being a state in which it is undetermined which one of multiple candidate target subjects is the gaze target;

determining a focus region to include a target subject when the gaze target undetermined state is applied; and, determining the target subject on a basis of an imaging situation during a prior gaze target determined state, wherein the imaging situation is a subject type of a prior target subject of the prior gaze target determined state.

20. The non-transitory computer readable medium of claim 19, wherein the subject type is one of a landscape, an animal, or an object.

\* \* \* \* \*